(12) United States Patent
Poveda et al.

(10) Patent No.: US 8,462,290 B2
(45) Date of Patent: Jun. 11, 2013

(54) FLAT SCREEN DEVICE WITH TRANSPARENT PROTECTION HOUSING

(75) Inventors: Stéphane Poveda, Ucel (FR); Laurent Laluque, Bordeaux (FR); Daniel Laret, Magudas (FR)

(73) Assignee: Thales, Neuilly sur Seine (FR)

( * ) Notice: Subject to any disclaimer, the term of this patent is extended or adjusted under 35 U.S.C. 154(b) by 364 days.

(21) Appl. No.: 12/675,534

(22) PCT Filed: Aug. 26, 2008

(86) PCT No.: PCT/EP2008/061153
§ 371 (c)(1),
(2), (4) Date: Aug. 13, 2010

(87) PCT Pub. No.: WO2009/027401
PCT Pub. Date: Mar. 5, 2009

(65) Prior Publication Data
US 2010/0302473 A1  Dec. 2, 2010

(30) Foreign Application Priority Data
Aug. 31, 2007 (FR) .................................... 07 06128

(51) Int. Cl.
*G02F 1/1333* (2006.01)
(52) U.S. Cl.
USPC ................... 349/60; 349/58; 349/59

(58) Field of Classification Search
USPC .............................. 349/58–65; 362/632–634
See application file for complete search history.

(56) References Cited

U.S. PATENT DOCUMENTS

| | | | |
|---|---|---|---|
| 6,429,587 B1 * | 8/2002 | Sugimachi et al. | 313/582 |
| 7,542,105 B2 * | 6/2009 | Sato et al. | 349/58 |
| 2002/0149714 A1 | 10/2002 | Anderson et al. | |
| 2002/0191127 A1 * | 12/2002 | Roberts et al. | 349/61 |
| 2005/0073640 A1 * | 4/2005 | Dunn et al. | 349/161 |
| 2007/0065091 A1 | 3/2007 | Hinata et al. | |

FOREIGN PATENT DOCUMENTS

| | | |
|---|---|---|
| EP | 1202617 A | 5/2002 |
| JP | 04 214528 A | 8/1992 |

* cited by examiner

*Primary Examiner* — Bumsuk Won
*Assistant Examiner* — Charles Chang
(74) *Attorney, Agent, or Firm* — LaRiviere, Grubman & Payne, LLP

(57) ABSTRACT

The display device comprises a display screen comprising a bonding surface and a mechanical structure. The display device also comprises a glass protective casing consisting of two sheets of glass and inserts. This protective casing is bonded to the structure beneath the second sheet of glass. The screen is bonded to the inside of the protective casing on only one of the two sheets.

The invention proposes a compact protective device for a flat screen which is applied essentially to liquid crystal matrix screens comprising light-emitting diode light. The preferred field of application is that of screens used for aviation.

8 Claims, 4 Drawing Sheets

FLAT SCREEN DEVICE WITH TRANSPARENT PROTECTION HOUSING

PRIORITY CLAIM

This application claims priority to PCT Patent Application Number PCT/EP2008/061153, entitled Flat Screen Device with Transparent Protection Housing, filed Aug. 26, 2008, also claiming priority to FR 0706128, filed Aug. 31, 2007.

FIELD OF THE INVENTION

The field of the invention is that of liquid crystal display screens (LCD). For certain applications, a display device comprising an LCD must withstand a harsh environment, notably in the civil or military aviation field. The device must make it possible to have correct legibility of the LCD, while retaining minimized thickness. It must be able to evolve in stressful environments subjected to vibrations and to impacts without breaking. It must be capable of withstanding the expansions between the different elements, such as the glass and the metal comprising the device, during rapid temperature variations. It is therefore necessary to protect the LCD which is the most sensitive element of the stack and the glass elements which surround the liquid crystal. In the case of vibrations for example, a defect results in the appearance of white halos. For all these reasons cited above, the stacks of glass of the LCD type must be damped.

BACKGROUND OF THE INVENTION

Routinely, the cells are placed in compression or else bonded on the periphery of their surface. A first display device is known according to document U.S. Pat. No. 6,606,132-B2 compressing an LCD screen between sheets of glass having resonance frequencies and thermal expansion coefficients similar to those of the LCD.

A second device is revealed in document CN 2,616,924-Y. It shows a frame clamping the optical stack based on a fastening system.

A third solution, shown in FIG. 1, is the use of adjustable spacers 12 and 15 and the installation of silicone seals 14 which serve as a damper for the periphery of the glass. This solution comprises structural parts 17 and inserts 18 pressing the various layers of the optical stack together. These structural parts are assembled mechanically by the fastening screws 16. This device ensures a precise slope on the glass stack and makes it possible to precisely adjust the pressure exerted on the thickness of the various sheets of glass. Depending on the batches of glass supplied, the thickness of the sheets may vary and the various spacers offer the possibility of precisely adjusting the assembly. Conversely, this solution requires having a considerable set of spacers in order to respond to the variety of thicknesses of glass. This constraint therefore has an impact on the cost of the solution. Moreover, adjusting the set of spacers and the pressure precisely greatly increases the time for assembling the solution.

A final solution consists of a pressure-setting element making it possible to control the force on the LCD cell and ensure the rate of compression on the damping seals. The pressure is exerted by an external cylinder and is maintained by transverse screws. The main disadvantage of this solution is that it requires costly production means for the pressure-setting relative to the assembly time.

These solutions have the disadvantage of being voluminous and costly. Added to this is the impossibility of developing around them a method of mass production. Today the new requirements make it necessary to propose a product having good performance in terms of withstanding thermal, electromagnetic, vibratory and impact stresses while not requiring manufacturing resources that are too complex or too costly.

SUMMARY OF THE INVENTION

More precisely, the subject of the invention is a display device offering a solution which differs from those explained above. The display device comprises a display screen comprising a bonding surface and a mechanical structure and also comprises a first sheet of glass situated between the observer and the screen, a second sheet of glass, both sheets being flat and parallel with one another, the rear face of each sheet defined as being the side of the light source of the device, and inserts placed between the first and the second sheet of glass; the assembly of the first sheet of glass, the second sheet of glass and the inserts forming a protective casing; the thickness of the casing obtained being greater than the thickness of the screen; the screen being bonded on the whole of its surface to only one of the two sheets over the central portion of one of the faces inside the casing. In our invention, the screen is a liquid crystal matrix and the display device comprises a light source placed between the bottom of the structure and the matrix. The protective casing isolates the LCD from the mechanical structure. The principle of protection is no longer to compress or to bond the LCD within the display device but to produce a stack of rigid glass and to assemble it to the structure in order to stiffen it and to protect the LCD. The two sheets of protective glass therefore act as two main beams stiffening the structure. To assemble the glass casing to the structure, the periphery of the rear face of the second sheet of the casing is bonded to the inside of the rigid mechanical structure. A flexible bond is used and is utilized for mechanical retention, damping, adjustment of the tolerances and assembly clearance. Its viscoelastic properties allow it to remain flexible in an extensive temperature range and to damp the impacts and vibrations. In the event of thermal shock, the sheets of glass can expand without creating stress on the LCD cell. In the event of impact on the front glass, the force will be transmitted to the structure via the front sheet of glass and the rear sheet of glass without impact on the LCD. In the event of vibration, only the front and rear sheets of glass work.

The glass casing provides two assembly configurations of the LCD. Either it is bonded to the inside of the casing on the rear face of the first sheet of protective glass, or on the front face of the second sheet of glass. In the first arrangement, the screen is as close as possible to the front sheet of glass and this promotes the attenuation of specular reflection. In the second configuration, the screen is bonded directly to the second sheet of glass of the casing. In our device, the second sheet of glass may also be a heater formed by a glass substrate. This promotes the conduction of heat to the LCD screen.

In order to improve the mechanical behavior of the display device, it is possible to envisage adapting the resonance frequency by one or more posts. In this case, the mechanical structure comprises a bottom and the display device at least one post providing the mechanical connection between the casing and the bottom. This post is then used to damp the glass casing on the mechanical structure. It is positioned between the lighting zone and the LCD screen and, so as not to hamper the lighting of the screen, this post may be transparent.

The display device has the advantage of offering much more effective protection to the LCD against high temperature variations, impacts and vibrations.

The stacking of the sheets of glass makes the product more compact in depth but also in the thickness of the stack due to the absence of a mount. Another advantage of the absence of a mount on the front face is to provide a more attractive product. The LCD is viewed over the whole of its surface area without the edges being hidden by a mount. This gives a refined facade which presents to the observer a display screen that is fully integrated into the cockpit.

Bonding the casing between the light source and the LCD makes it possible to reduce the space requirement of the device widthwise. For this configuration, it is possible to extend the zone of adhesive up to the effective zone of lighting of the LCD, a smaller surface than the surface of the screen. In the reverse configuration, in which bonding of the casing is carried out between the LCD and the observer, the zone of adhesive must be positioned on the periphery of the LCD so as not to hide a portion of the screen from the observer. The advantage that results from this is the reduction in the distance between the effective zone of the LCD and the edge of the product.

The invention will be better understood and other advantages will appear on reading the following description given in a nonlimiting manner and by virtue of the appended figures amongst which:

DETAILED DESCRIPTION OF PREFERRED EMBODIMENT

Figure 1:
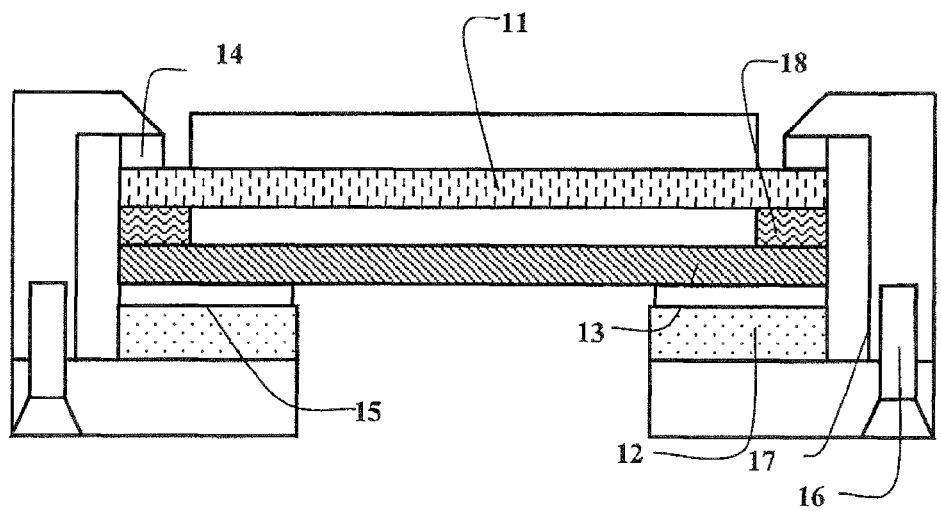
FIG. 1 represents the view in section of a prior glass-stacking solution using adjustable spacers.
Figure 2:
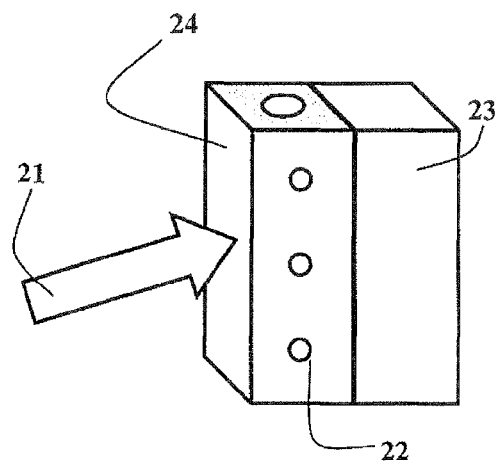
FIG. 2 is a three-dimensional view of a prior solution using a pressure-setting element.

FIGS. 1 and 2 show two prior compression solutions explained above. In FIG. 1, the LCD 11 is pressed onto the heater 13 placed on the silicone seal 14 which serves as a damper. The spacers 12 and 15 are used to provide the same compression ratio on the seals by clamping the screws 16. In the second figure, the arrow 21 represents the pressure exerted on the pressure-setting element 24. The compression ratio is maintained on the damping seals of the LCD 23 by the transverse screws 22. These two solutions have drawbacks in terms of cost, space requirement and manufacture.

Figure 3:
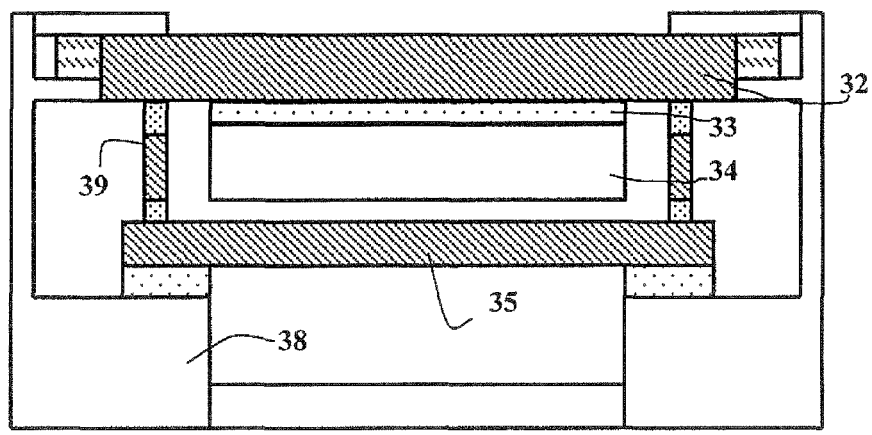
FIG. 3 shows a first embodiment in section with the LCD screen bonded to the underside of the front protective glass.
Figure 4:
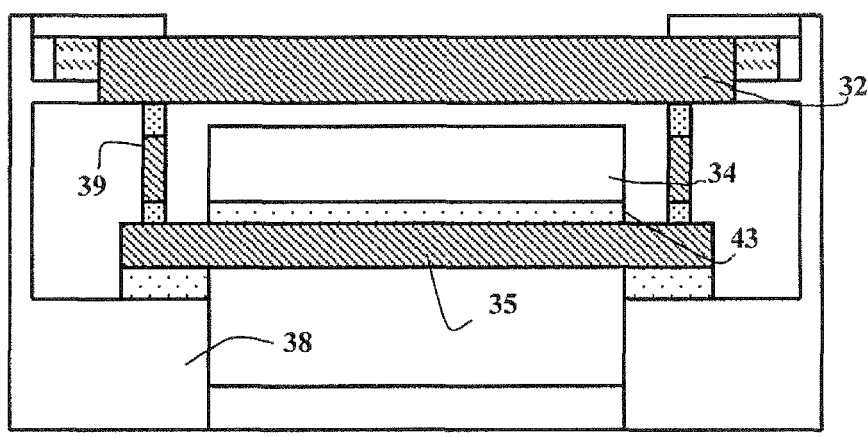
FIG. 4 is a second embodiment in section with the LCD screen bonded to the upper side of the rear protective glass.
Figure 5:
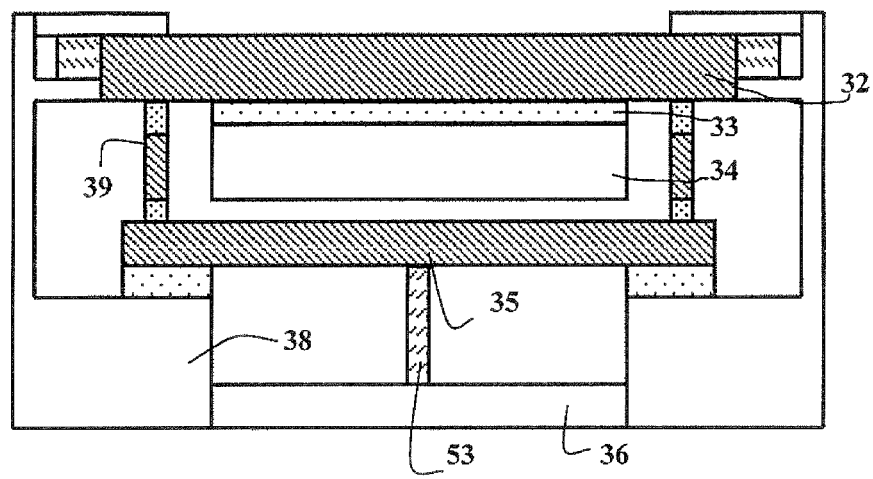
FIG. 5 is a third embodiment in section using a damping post, positioned between the second protective glass and the bottom of the casing.

The invention is divided into three configurations described in FIGS. 3, 4 and 5. The particular feature of the display device is that it protects the glass sheets of the screen 34, the most fragile elements, inside a glass casing that also serves as a structure. This glass casing consists of a first sheet of protective glass 32, a second sheet of protective glass 35 and spacers 39.

FIG. 3 shows the device in which the whole screen 34 is fixed by a layer of adhesive 33 inside the casing on the underside of the first sheet of protective glass 32. The effect of this configuration is that it promotes the attenuation of specular reflection, the adhesive performing index matching.

FIG. 4 shows the second configuration in which the screen 34 is attached to the inside of the casing by a layer of adhesive 43 on the upper side of the second sheet of protective glass 35. The second sheet of glass may be a heater or a diffuser. In this arrangement, the screen is closer to these elements and therefore promotes the effect of the heater but also that of the diffuser.

FIG. 5 is the configuration in which the mechanical strength of the stack is enhanced with a post 53. The mechanical structure comprises a bottom 36 and the display device at least one post providing the mechanical connection between the casing 35 and the bottom 36. This post is transparent so as not to hamper the lighting of the light source. Several posts may be used to match the resonance frequencies. This third configuration may be complementary both to the first and the second configuration. In the example of FIG. 5, the screen is bonded to the rear face of the first sheet of glass.

Figure 6:
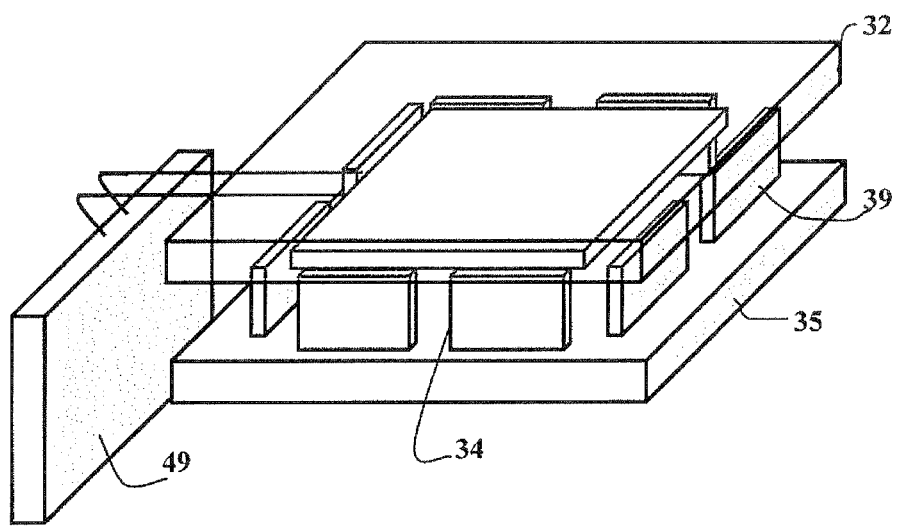
FIG. 6 represents a simplified, three-dimensional view of the stack of glass of the first embodiment without the rigid mechanical structure.

FIG. 6 is a three-dimensional view which shows only the glass casing, consisting of the first protective sheet 32, the second sheet 35 and the inserts 39. The screen assembly 34 is placed in the configuration described in FIG. 3. The element 49 is the electronic circuit board controlling the screen. This board is connected via a flexible connector placed between the inserts.

Figure 7:
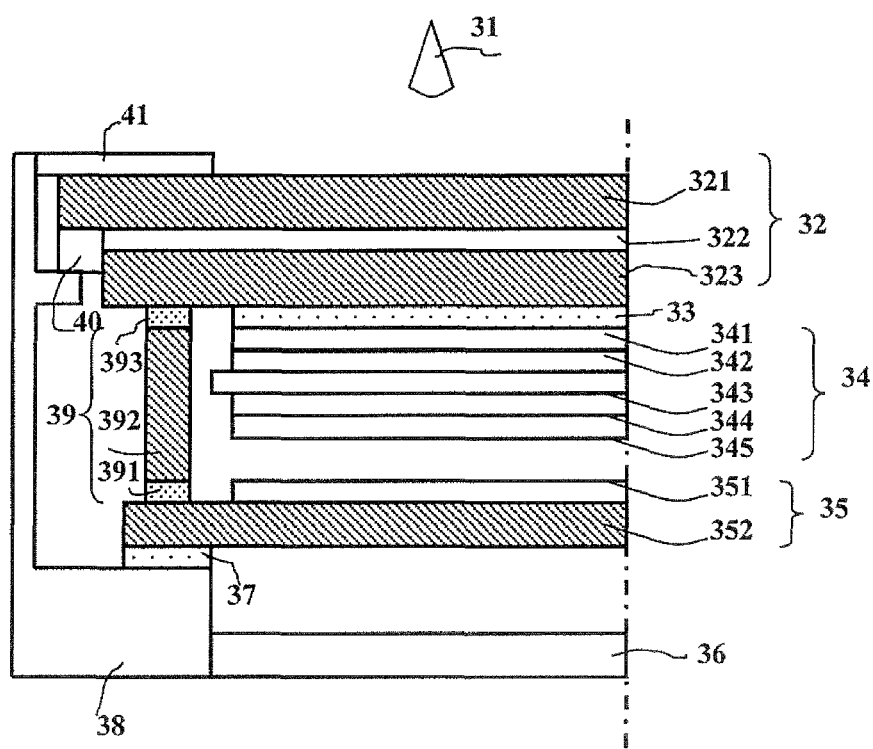
FIG. 7 is a half-section of the invention showing the various layers of glass and their arrangements in the display device.

As a nonlimiting example, FIG. 7 gives details of a display device according to the invention in a sectional view representing the optical stack. It is an exemplary configuration capable of being used in an aviation environment.

The first protective glass 32, situated between the observer 31 and the screen assembly 34, consists of two sheets of glass 321 and 323, and comprises an electromagnetic shield 322 for the screen. As an example, the thickness of the sheets of glass 321 and 323 is 1.1 mm and that of the shield is 0.6 mm. This element 32 is used to stiffen the structure of the display device and to protect the screen 34 from the electromagnetic interference of the outside environment and also protects the outside environment from any interfering transmissions from the screen. For an application inside an aircraft cockpit, the screen must not transmit interference electromagnetic fields. The seal 40 is a flexible conductor. It is a ground transfer element making it possible to maintain the electric contact, even in vibration, between the electromagnetic shield 322 and the structure 38. This seal is also used to keep the inside of the display device sealed against fluids and dust and to prevent the light emitted by the source 36 from being seen on the periphery of the LCD. In our example, the light source 36 consists of light-emitting diodes, but other technologies, such as organic light-emitting diodes or fluorescent tubes could be used in the device.

The second protective glass 35 of the casing, situated between the light source 36 and the screen assembly 34, serves as a structure and also comprises a heater consisting of a 1.1 mm glass substrate 352. This heater is used to keep the screen 34 in a correct operating temperature range. A 1 mm diffuser 351 is placed on the heater.

These two protective glass assemblies, 32 and 35, are the main protective elements of the glass casing. In this example, they have another function, as electromagnetic shield for the glass 32 and heater for the glass 35, because of the aviation application, but it is quite possible to develop the invention by using simple sheets of glass. They are assembled by glass inserts 39. These inserts made of glass substrate 392 are bonded to the front protective glass 32 by a first layer of adhesive 393, and to the rear protective glass 352 by a second layer of adhesive 391. The various elements of the glass casing are made of one and the same material.

Inside the casing described above, an assembly 34 comprising a liquid crystal matrix is attached by a layer of optical adhesive 33 transparent to ultraviolet. This assembly includes successively a 0.375 mm front polarizer 341, the 0.6 mm LCD counter electrode matrix 342, the 0.6 mm control electronics 343 comprising transistors, commonly called TFT (Thin Film Transistor), the 0.22 mm rear polarizer 344 and the brightness-enhancement film 345, called DBEF (Dual Brightness Enhancement Film). The 0.3 mm layer of adhesive 33 is used over the whole surface of the assembly 34, which is thus bonded to the central portion of the protective glass of the casing. As an example, the total thicknesses of the elements of the screen 34 and of the adhesive 33 is 2.095 mm. The thickness of the glass inserts 39 is greater than this value. So the screen 34 is bonded only to one of the protective sheets of glass.

The whole of the glass casing is fixed to the structure 38 by a layer of adhesive 37. This layer of adhesive is deposited only on the periphery of the rear surface of the second protective sheet of glass. This adhesive has viscoelastic properties making it possible to withstand high temperature variations and impacts and vibrations. As an example, it is possible to use the adhesives that are utilized in the motor vehicle industry for bonding windshields. The screen printing 41 is opaque to ultraviolet rays and serves to protect the adhesive and to mask the components of the stack.

The forces that are applied to the front glass 32 of the display device are entirely transmitted to the rear glass 35 via the inserts 39. The glass 35 serves as a structure and therefore transmits these forces to the structure 38. The principle of this display device is to isolate an LCD inside a protective casing. This fragile assembly must not be compressed between the sheets of protective glass, in which case the forces would be transmitted to the structure through this element. Validations have demonstrated a resistance to impacts, to vibrations but also to temperature variation that is much greater than the prior solutions and this is so for a device that is more compact and able to be applied to all screen sizes. Moreover, it is a solution that is easier to apply for placing in mass production.

The invention claimed is:

1. A display device comprising a display screen having a first thickness, a bonding surface, and a mechanical structure, wherein the display device further comprises;
   a. a light source;
   b. a first sheet of glass being flat, having a central portion and a first rear face, and being situated between an observer and the display screen;
   c. a second sheet of glass being flat, having a central portion and a second rear face and being parallel to the first sheet of glass, the first and second rear faces positioned to face the light source;
   d. inserts:
      i. placed at a distance from the display screen; and
      ii. placed between the first and the second sheet of glass and assembled in such a way that the first sheet of glass, the second sheet of glass and the inserts form a protective casing;
   e. the protective casing:
      i. having a second thickness; the second thickness being greater than the first thickness; the screen being bonded on the whole of its surface to only one of the two sheets over its central portion inside the casing;
      ii. being fixed to the inside of the mechanical structure by a flexible layer of adhesive deposited only on the periphery of the rear surface of the second protective sheet of glass.

2. The display device as claimed in claim 1, wherein the second sheet of protective glass of the casing is also a heater comprising a glass substrate.

3. The display device as claimed in claim 1, wherein the first sheet of protective glass of the casing comprises an electromagnetic shield for the screen.

4. The display device as claimed in claim 1, wherein the screen is fixed by a layer of adhesive to the inside of the casing on the rear face of the first sheet of protective glass.

5. The display device as claimed in claim 1, wherein the screen is fixed by a layer of adhesive to the inside of the casing on the front face of the second sheet of protective glass.

6. The display device as claimed in claim 4 or 5, wherein the mechanical structure comprises a bottom and the display device at least one post providing the connection between the casing and the bottom.

7. The display device as claimed in claim 6, wherein the post is transparent.

8. The display device as claimed in claim 1, wherein the screen is a liquid crystal matrix and the display device comprises at least one light source placed between the bottom and the screen.

\* \* \* \* \*